Patented Nov. 17, 1942

2,302,384

UNITED STATES PATENT OFFICE 2,302,384

PARASITICIDAL PREPARATION

William P. ter Horst, Packanack Lake, N. J., assignor to United States Rubber Company, New York, N. Y., a corporation of New Jersey No Drawing. Application July 11, 1939, Serial No. 283,817

8 Claims. (Cl. 167—30)

This invention relates to new and useful improvements in parasiticidal preparations.

More particularly the invention relates to parasiticides which may be used as fungicides, seed protectants, insecticides, insect repellents, or bactericides.

This case is a continuation-in-part of my application Serial No. 234,962, filed October 14, 1938.

The parasiticides include quinone-oxime type compounds in which a quinone nucleus is doubly bonded to each of two nitrogen atoms, the remaining valency of each nitrogen atom being satisfied by oxygen. They may be used in the form of sprays or dusts, alone or in combination with other fungicides or insecticides, or in combination with fertilizers or with suitable auxiliary agents such as wetting agents, sticking agents, spreading agents, etc.

While some of the compounds have outstanding value as fungicides, other of the compounds have outstanding insecticidal value including their use as stomach poisons or as insect repellents for such pests as the Mexican bean beetle, Southern army worm, Colorado potato beetle, etc. This latter is particularly true of ortho-benzoquinone dioxime, and para-benzoquinone dioxime.

As a seed protectant or fungicide the product obtained by mild oxidation of ortho-nitraniline with sodium hypochlorite in known manner, and which may be called ortho-benzoquinone dioxime peroxide, has outstanding value. It greatly assists in controlling the phenomenon which is usually called "damping off" which causes a decrease in the percentage of germination, low speed of emergence, and non-vigorous plants due to soil fungi which are harmful to the seed and the sprout, such as the Pythium spore, the Fusarium spore, and the Rhizoctania spore. The said oxidation product also functions as a lubricant for the seed resulting in less interlocking of the seeds in the feed drill and in less damage to the seed and to the equipment. This is in contrast with most of the chemical dusts that are used commercially at the present time as most of those increase the friction.

The tests tabulated below demonstrate the effectiveness of the new fungicides in preventing spore germination. The tests were carried out as follows:

An aqueous solution or suspension of the chemical to be tested containing 5 grams thereof per liter of water was prepared. This solution or suspension was sprayed on glass slides which had previously been coated with nitrocellulose. An atomizer was used capable of delivering 10 cc. spray liquid in 36 seconds. A glass slide was positioned two feet away from the nozzle of the atomizer. Spraying was carried out for, respectively, 3 seconds, 5½ seconds, 8 seconds, 10½ seconds and 13 seconds. The spray deposit was allowed to dry. The test organism, for example Macrosporium Sarcinaeforme was then inoculated on the sprayed slide and germination was allowed to take place in a moist chamber at 25° C. On the untreated slides usually approximately 98% of the spores germinated.

*Per cent spore germination*

| Chemical | 3″ | 5½″ | 8″ | 10½″ | 13″ |
|---|---|---|---|---|---|
| p-Benzoquinone dioxime | 49.0 | 32.3 | 5.3 | 3.7 | 0.0 |
| o-Benzoquinone dioxime | 4.3 | 4.0 | 4.0 | 4.0 | 4.0 |
| Sodium salt of p-benzoquinone dioxime | 89.0 | 75.7 | 48.3 | 16.0 | 17.0 |
| Zinc salt of p-benzoquinone dioxime | 11.3 | 8.3 | 6.7 | 5.7 | 2.3 |
| Sulfurized p-benzoquinone dioxime | 81.3 | 34.0 | 6.0 | 6.0 | 3.0 |
| p-Benzoquinone dioxime dimethyl ether | 94.3 | 97.0 | 94.0 | 90.0 | 66.7 |
| Zinc salt of thymoquinone dioxime | 26.0 | 9.7 | 0 | 0 | 0 |
| o-Benzoquinone dioxime peroxide | 4.0 | 0 | 0 | 0 | 0 |

It was also found that para-benzoquinone-dioxime was very effective in preventing fungus growth of a number of other fungi such as Coccomyces hiemalis, Rhizopus nigricans, Penicillium spore, Aspergillus spore, Phoma spore, etc.

The effectiveness of the aforesaid oxidation product of ortho-nitraniline as an organic seed protectant is illustrated by the following experiments:

Pea seed of the variety "Wilt Resistant Perfection" was dusted with .25% by weight of the oxidation product by tumbling the same and the seed in a container until mixing has been accomplished. The seed was then put in a soil artificially inoculated with *Rhizoctania solani*. The following observations were made:

| | Emergence after 7 days | Emergence after 23 days | Average height of sprout after 23 days |
|---|---|---|---|
| | *Percent* | *Percent* | *Centimeters* |
| Untreated seed | 21 | 51 | 10.0 |
| Seed treated with .25% of the sodium hypochlorite oxidation product of ortho-nitraniline | 51 | 87.0 | 14.28 |

A similar test made in soil artificially inoculated with Sclerotina spore gave the following results:

|  | Emergence after 7 days | Emergence after 23 days | Average height of sprout after 23 days |
|---|---|---|---|
| Untreated seed | Per cent 19 | Per cent 42 | Centimeters 10.5 |
| Seed treated with .25% of the sodium hypochlorite oxidation product of ortho-nitraniline | 25 | 95 | 15.1 |

Lima bean seed was planted in soil that was known to have a high "damping off" potential with the following results:

|  | Emergence after 7 days | Emergence after 14 days | Emergence after 23 days | Av. height of sprout after 23 days |
|---|---|---|---|---|
| Untreated seed | Per cent 3 | Per cent 8 | Per cent 14 | 10.2 |
| Seed treated with .25% of the sodium hypochlorite oxidation product of ortho-nitraniline | 0 | 26 | 46 | 17.5 |

Instead of the aforesaid oxidation product of ortho-nitraniline, there may be used the analogous oxidation products of para-nitraniline and in general of other ortho- or para-nitro substituted amines such as nitro toluidines, nitro naphthylamines, etc. Other related compounds may be used such as 3,4-benzofurazane

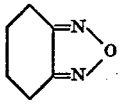

which can be made by dehydrating ortho-benzoquinone dioxime; para-benzoquinone dioxime peroxide

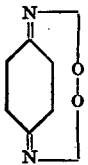

para-benzoquinone dioxime anhydride

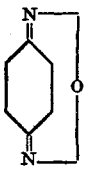

Other compounds falling within the scope of the invention are p-benzo-quinone dioxime bis acetate (anti-form), p-benzoquinone dioxime bis acetate (syn form), copper salt of p-benzoquinone dioxime, diquinoyl-tetroxime, 4-chloro-ortho-quinone dioxime peroxide, the naphthoquinone dioximes, the toluquinone dioximes, the xyloquinone dioximes, the anthraquinone dioximes, and their derivatives corresponding to the above, illustrated in connection with the benzoquinone dioximes; metallic salts other than those particularly mentioned above, such as potassium, ammonium, mercury, magnesium and calcium salts; halogen-substituted dioximes in which halogen replaces hydrogen of the benzene ring, such as monochloro-orthoquinone di-oxime; tetrachloro-p-benzoquinone dioxime; diquinoyl dioxime; naphthoquinone dioxime peroxides; naphthoquinone dioxime anhydrides.

The materials described herein may be applied undiluted, or suspended in water or other vehicle, or mixed with talc, clay and the like, or as aforesaid may be used in admixture with other parasiticidal chemicals.

Having thus described my invention, what I claim and desire to protect by Letters Patent is:

1. A bactericide, fungicide, and insecticide preparation containing as an active constituent a quinone dioximino compound.

2. A bactericide, fungicide, and insecticide preparation containing as an active constituent a benzoquinone dioxime.

3. A bactericide, fungicide, and insecticide preparation containing as an active constituent ortho benzoquinone dioxime.

4. A bactericide, fungicide, and insecticide preparation containing as an active constituent an oxidation product of a nitro substituted aromatic amine, said product having a quinone nucleus doubly bonded to each of two nitrogen atoms.

5. A bactericide, fungicide, and insecticide preparation containing as an active constituent ortho benzoquinone dioxime peroxide.

6. A bactericide, fungicide, and insecticide preparation containing as an active ingredient a benzene compound having each of two nitrogen atoms doubly bonded to the benzene nucleus both of said nitrogen atoms being additionally bonded to oxygen.

7. A bactericide, fungicide, and insecticide preparation containing as an active constituent para-benzoquinone dioxime.

8. A fungicide preparation containing as an active constituent an oxidation product of ortho-nitraniline, said product having a quinone nucleus doubly bonded to each of two nitrogen atoms.

WILLIAM P. ter HORST.